May 16, 1950 G. W. GOODSON 2,507,536
BATH SPRAY OR LIKE CONNECTOR
Filed March 14, 1947 2 Sheets-Sheet 1

Inventor
George W. Goodson
By Rockwell␣␣Bartholow
Attorneys

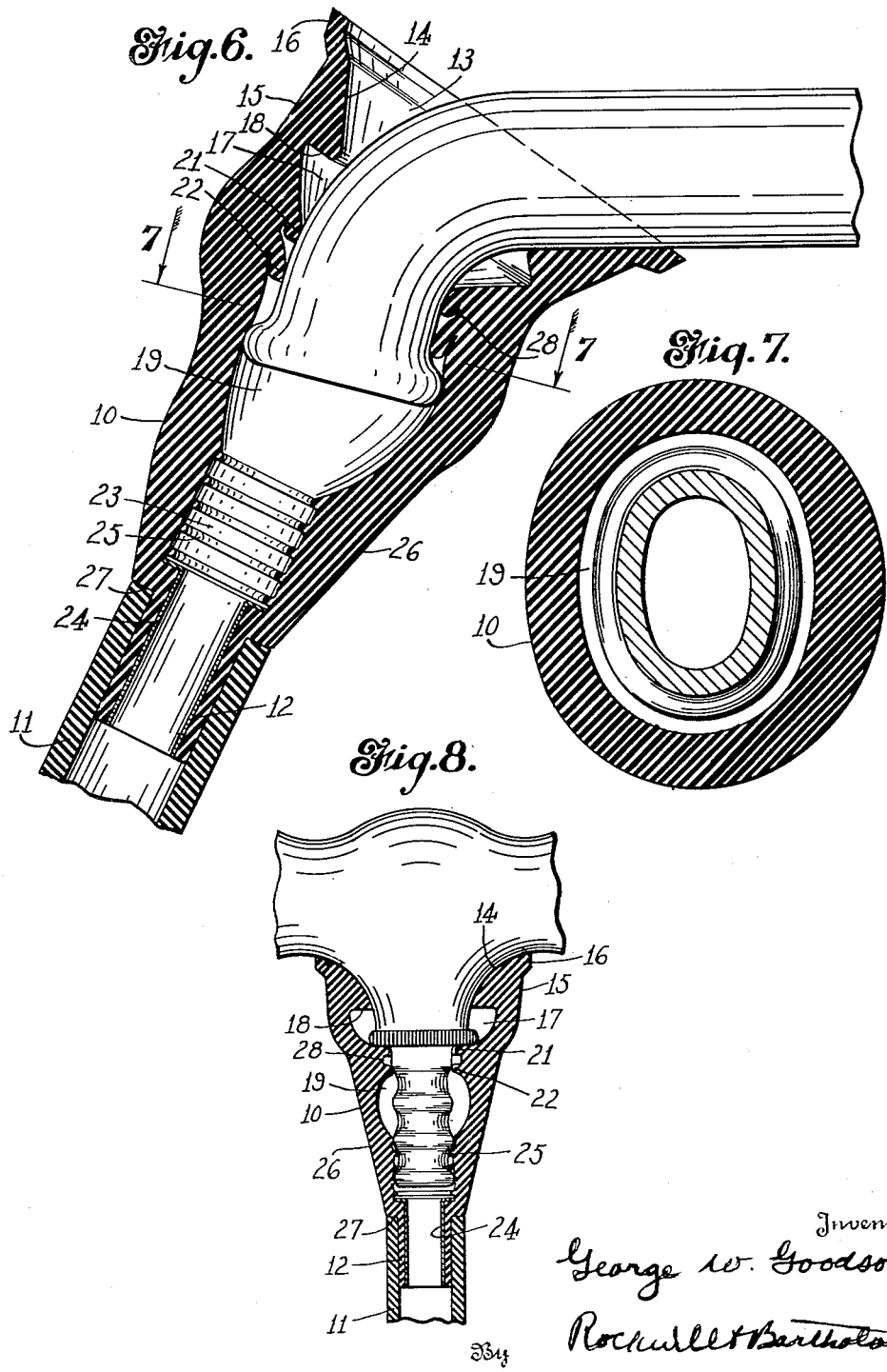

Patented May 16, 1950

2,507,536

UNITED STATES PATENT OFFICE 2,507,536

BATH SPRAY OR LIKE CONNECTOR

George W. Goodson, North Haven, Conn., assignor to The Seamless Rubber Company, New Haven, Conn., a corporation of Connecticut Application March 14, 1947, Serial No. 734,572

2 Claims. (Cl. 285—90)

This invention relates to bath spray or like connectors, and more particularly to those in which the bath spray or like device is provided with a connector in the nature of a faucet adapter which is usable with faucets of different shapes and sizes.

An object of the invention is to provide a simple, inexpensive form of connector that can be used successfully with a maximum number of faucet shapes and sizes.

Another object is to provide an improved faucet adapter which, under a wide variety of conditions, provides a leakproof connection to the faucet or other outlet.

In the accompanying drawings:

Fig. 6 is a longitudinal sectional view of the connector showing its use with another kind of faucet;

Fig. 7 is a section on line 7—7 of Fig. 6; and

Fig. 8 is a further sectional view of the connector showing its use with a further kind of faucet.

Figure 1:
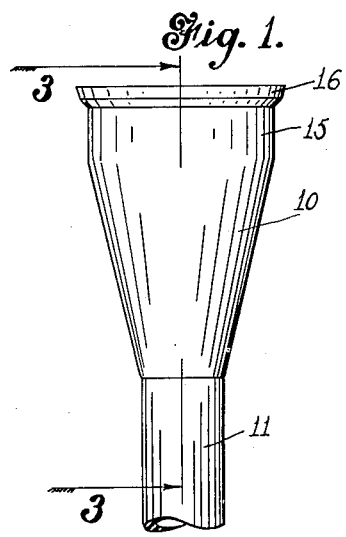
Fig. 1 is a side elevation of a connector embodying the invention, illustrating the same as applied to a bath spray hose of rubber.
Figure 2:
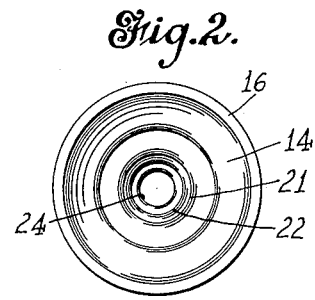
Fig. 2 is a top plan view of the article of Fig. 1.

In the article shown in the drawings, there is provided a casing adapted to be used as a connector applicable to faucets of different kinds and sizes, said casing being a flexible elastic one constructed of rubber, the term "rubber" being used in a broad sense. This casing is made in a single piece, and, generally speaking, is of elongated, conical shape having a smaller end adapted for connection with a flexible hose or tube, and a larger open end by means of which the casing can be pushed over the faucet or other outlet. The upper open end of the casing is provided with a flaring mouth which facilitates application to the faucet, and between the mouth and the lower or outlet extremity of the connector, the connector is interiorly chambered, as hereinafter described, and the chambers provided with faucet-engaging means in the nature of gripping elements or shoulders so as to provide for leakproof engagement with different faucets.

Figure 3:
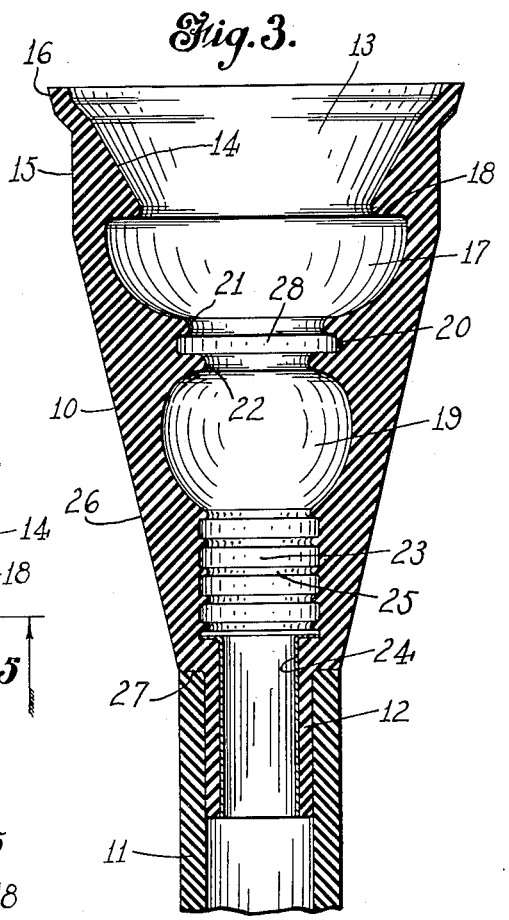
Fig. 3 is an enlarged section on line 3—3 of Fig. 1.

In the drawings, the connector is shown at 10 and the rubber hose at 11. In this particular form, the hose 11 surrounds and is suitably connected to reduced lower extremity 12 of the connector, as by cementing, the extremity 12 being constituted by a rubber sleeve integral with the connector body. The mouth at the upper end of the body is indicated at 13, the mouth being of flaring shape as above mentioned, and in this form having a smooth, inclined inner surface 14. The mouth is in an upper end portion of the connector body provided with an external cylindrical surface 15. The surfaces 14 and 15 define between them a wall which increases in cross section in a downward direction, and at the upper end of this wall the connector is provided with an integral flange 16 extended in a lateral direction with respect to the cylindrical surface 15. The provision of the flange 16 enables the mouth 13 to be made of greater diameter in the region of the upper extremity of the connector, as shown in Fig. 3.

Below the mouth 13 the connector body is provided with an interior chamber 17, which is undercut with respect to the mouth so as to provide a faucet-engaging shoulder 18 at the junction of the mouth and chamber. Below the chamber 17 there is provided a chamber 19 of smaller diameter separated from the chamber 17 by a restricted portion, generally indicated at 20, which restricted portion is provided with inwardly projecting flanges 21 and 22, the flange 21 being an upper flange and the flange 22 a lower flange. The chamber 19 leads at its lower end into a passage 23 which is in communication with the passage or bore within the sleeve portion 12. The sleeve portion 12 may be provided with a thin liner 24 of metal or other suitable material. The passage 23 is generally cylindrical in shape and is provided interiorly with a number of small ribs or flanges 25.

In the form shown, the connector body has an outer surface 26 shaped as an elongated cone extending substantially from the lower sleeve portion 12 to the cylindrical surface 15. In the form shown the lower end of the elongated conical portion is of somewhat larger diameter than the sleeve portion 12 so as to create at the junction of said portions a shoulder 27 against which the rubber tube 11 abuts. However, variation may be made in this respect if desired.

In the form shown, the upper wall or ceiling of the chamber 17 is near the upper end of the exteriorly conical portion defined by the surface 26, and the inner surface of the chamber is rounded and extends to the upper flange 21 previously mentioned. The upper flange 21 defines a round opening of somewhat larger diameter than the round opening defined by the lower flange 22, and between these two flanges the connector body is provided with a substantially cylindrical surface 28 providing an opening of somewhat greater diameter than the opening defined by upper flange 21. Preferably the flanges 21 and 22 are rounded, as shown, so as to provide flange members in the nature of elastic beads.

The chamber 19 is of less diameter than the chamber 17, and preferably has a gradually rounded inner surface. This chamber provides an undercut below the flange 22. The chambers 17 and 19 are shaped to provide in conjunction an elastic wall portion for the connector body which is laterally thicker in the region between the two chambers than in other regions, the region between the two chambers being that upon which the flanges 21 and 22 are provided. The result of this is that the flanges 21 and 22 are strongly supported by a thick wall portion with which they are integral, the purpose of this being as hereinafter explained.

It will be noted that the chamber 17 is substantially wider at the upper part than at the lower part, whereas the chamber 19 has a diameter at the lower end that approximates its diameter at the upper end. The lower end of the latter chamber is in communication with the passage 23, which is one of substantial length, and at the lower end of passage 23 the diameter of the passage in the body is reduced to correspond to the diameter of the bore in the projecting sleeve portion 12. The lower end of the passage 23 is somewhat above the shoulder 27 in this particular form of the article.

As regards the thickness of the body wall, it will be noted that this wall is relatively thin at the flanged extremity of the mouth 13 to give good flexibility, whereas the wall is quite thick where the retaining shoulder 18 is provided, and is even thicker in the region where the flanges 21 and 22 are provided. In the region surrounding the passage 23, the wall thickness is somewhat less in the lower portion than in the upper portion.

The article as above described is adapted for successful use with a large number of different faucets. Some examples of the different uses are as given below.

Figure 4:
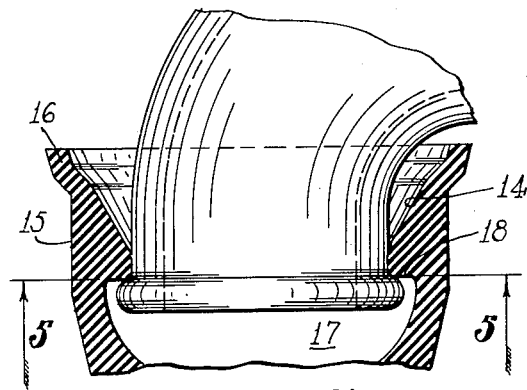
Fig. 4 is a sectional view of the upper part of the article illustrating its use on a faucet.
Figure 5:
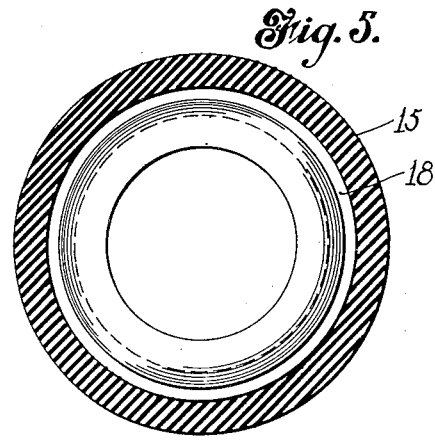
Fig. 5 is a section on line 5—5 of Fig. 4.

In the case illustrated in Figs. 4 and 5, the faucet is one having a short spout, the spout itself being of rather large diameter and having a terminal bead. Such a faucet is used in the relation shown, with the beaded extremity extended down into the upper part of the chamber 17, the side surface of the spout being engaged with the retaining shoulder 18 immediately above the bead on the faucet. The shoulder 18 is relatively thick in a lateral direction, and this part of the connector body is placed under compression when and as the faucet is placed in the position shown. As a result there is a very strong gripping of the faucet above the bead, and there is fluid-tight engagement of the connector with the faucet. Moreover, there is considerable water pressure in the chamber 17 as a result of the fact that the lower part of this chamber is constricted, and thus a force is exerted tending to lengthen the connector body, which has the effect of decreasing the diameter of the shoulder 18 and increasing its gripping action.

In the example shown in Fig. 6, the faucet selected for illustration is one having an elliptical cross section, and the dimension across the minor axis is substantially less than the diameter of the faucet shown in Fig. 4. The dimension across the major axis is also somewhat less than the diameter of the faucet shown in Fig. 4. However, the cross section of the faucet shown in Figs. 6 and 7 might be round rather than elliptical, and the faucet might have a plain end instead of the beaded end shown in Fig. 6. In any case the end of the faucet (which in this particular case is at an obtuse angle to the main part of the faucet) is located partly within the chamber 19, and the leakage of water is prevented by the flanges 21 and 22 which grip the spout laterally in the manner shown. The fact that the connector body is elongated and flexible and resilient enables it to accommodate itself to the obtusely angled spout, as shown. When the connector body is forced over the spout, the action is facilitated by the engagement of the inclined or beveled inner surface of the mouth with the end of the faucet. The constricted portion of the connector, including the two flanges, is then moved over the faucet end, and in this connection the fact that the lower part of chamber 17 is sloped downwardly and inwardly is of advantage. Moreover, the opening defined by the flange 21 is larger than that defined by the flange 22 so as to provide a sort of funnel for the faucet end, the action of which is to facilitate and expedite the movement of the connector over the faucet end with proper centering and no jamming. While both of the flanges grip the side of the spout, the lower flange has a greater gripping action and a greater water-excluding effect. When the connector is slipped over the faucet, the flanges, engaging the side of the spout, are deflected in a downward direction and compressed, and bear with their side surfaces against the spout in the manner shown in Fig. 6, so as to conform to the spout surface and exclude water. It has been previously stated that the flanges are provided upon a wall portion having considerable thickness, and the result is that the wall which supports the flanges is very substantial and not easily distorted or distended. Consequently, the flanges, being solidly supported, stand firmly against the spout in water-excluding relation. Water passes from the spout directly into the lower part of the chamber 19, and from that chamber passes to the passage 23 and the outlet sleeve 12.

In the example illustrated in Fig. 8, the faucet is a duplex faucet such as commonly used in bath tubs, having a T-shaped body from the lower portion of which projects a separable, transversely ribbed discharge nozzle. For such a faucet, connection is made in the manner shown in Fig. 8, the relatively small-diametered nozzle being inserted within the passage 23 of the connector. The middle and upper parts of the connector will adapt themselves to the faucet in the manner shown in Fig. 8. The upper flexible rim portion of the connector conforms to the lower surface of the faucet body, and the upper part of the connector is somewhat collapsed, and the part of the faucet which is located immediately above the nozzle is accommodated in the chamber 17. Inasmuch as the nozzle of the faucet is inserted into the passage 23, which is of proper diameter for the purpose, that part of the connector, which is provided with the small ribs 25, is very snugly engaged with the nozzle and there is no leakage of water from the upper end of the connector body. It is, of course, understood that the diameter of the nozzle just referred to is substantially less than the diameter of the faucet shown in Fig. 6.

The improved connector is also well adapted for use with various other faucets. In general, the faucets shown as examples are of three diameters substantially differing from each other, but the connector is applicable to various other diameters as well as various other faucet shapes.

It will be apparent from the foregoing that the connector is of relatively simple form, and can be inexpensively produced as a molded and vulcanized article of rubber made in one piece.

It is understood that the connector selected for illustration is by way of example only, and that various modifications and changes may be made without departing from the principles of the invention or the scope of the claims.

What I claim is:

1. In a faucet connector having a body of the elastic distendable type with a lower discharge end for attachment to a hose and an upper end providing an open mouth adapted to be entered by the faucet and wherein said body is provided with a chamber immediately below said mouth having a relatively flat ceilng which in connection with the mouth provides a faucet-retaining shoulder, the combination with said chamber of a second chamber lying below the first mentioned chamber and communicating therewith by a constricted portion, said constricted portion having a relatively thick wall supporting flexible upper and lower inwardly projecting faucet-engaging flanges adapted to engage and to be pressed sidewise by the side of a faucet projected through the first chamber and into the second chamber, said second chamber being in communication with the discharge at the lower end of the body.

2. In a faucet connector having a body of the elastic distendable type with a lower discharge end for attachment to a hose and an upper end providing an open mouth adapted to be entered by the faucet and wherein said body is provided with a chamber immediately below said mouth having a relatively flat ceiling which in connection with the mouth provides a faucet-retaining shoulder, the combination with said chamber of a second chamber lying below the first chamber and communicating therewith by a constricted portion, said constricted portion having a relatively thick wall supporting flexible upper and lower inwardly projecting faucet-engaging flanges adapted to engage and to be pressed sidewise by the side of a faucet projecting into said second chamber, the opening defined by the upper flange being larger than that defined by the lower flange to thereby facilitate and expedite movement of the connector over the faucet end, said second chamber being in communication with the discharge at the lower end of the body.

GEORGE W. GOODSON.

REFERENCES CITED

The following references are of record in the file of this patent:

UNITED STATES PATENTS

| Number | Name | Date |
|---|---|---|
| 561,441 | Schmidt | June 2, 1896 |
| 1,180,733 | Mulherin | Apr. 25, 1916 |
| 1,681,838 | Conklin | Aug. 21, 1928 |
| 1,985,502 | Isenberg | Dec. 25, 1934 |
| 2,071,842 | Kennedy | Feb. 23, 1937 |